United States Patent
Im et al.

(10) Patent No.: US 11,602,693 B2
(45) Date of Patent: Mar. 14, 2023

(54) METHOD AND APPARATUS FOR PROVIDING A GAME WITH ENHANCED UNEXPECTEDNESS

(71) Applicant: KRAFTON, Inc., Seongnam-si (KR)

(72) Inventors: Sung Jin Im, Seoul (KR); Yong Eun Jung, Seoul (KR)

(73) Assignee: KRAFTON, Inc., Seongnam-si (KR)

( * ) Notice: Subject to any disclaimer, the term of this patent is extended or adjusted under 35 U.S.C. 154(b) by 0 days.

(21) Appl. No.: 17/201,746

(22) Filed: Mar. 15, 2021

(65) Prior Publication Data

US 2021/0252405 A1     Aug. 19, 2021

(30) Foreign Application Priority Data

Jan. 16, 2020    (KR) .................. 10-2020-0005692

(51) Int. Cl.
| | | |
|---|---|---|
| A63F 13/69 | (2014.01) | |
| A63F 13/55 | (2014.01) | |
| A63F 13/822 | (2014.01) | |
| A63F 13/85 | (2014.01) | |
| A63F 13/5378 | (2014.01) | |
| A63F 13/56 | (2014.01) | |

(52) U.S. Cl.
CPC .............. *A63F 13/69* (2014.09); *A63F 13/55* (2014.09); *A63F 13/822* (2014.09); *A63F 13/85* (2014.09)

(58) Field of Classification Search
None
See application file for complete search history.

(56) References Cited

U.S. PATENT DOCUMENTS

2016/0332074 A1* 11/2016 Marr ..................... A63F 13/55
2019/0385379 A1* 12/2019 Woo ................... A63F 13/5375

FOREIGN PATENT DOCUMENTS

| KR | 10-1642956 B1 | 7/2016 |
| KR | 10-1982342 B1 | 5/2019 |
| KR | 10-2016987 B1 | 8/2019 |

OTHER PUBLICATIONS

Web document; "Open Battleground Inventory Map Information"; Internet INVEN website posted on Dec. 8, 2017; total 6 pages; Internet URL: https://www.inven.co.kr/board/battlegrounds/5046/65703.

Naver Blog; "Battleground Novice Q & A"; the Internet naver blog posted on May 10, 2017; total 9 pages; Internet URL: https://blog.naver.com/jgns0101/221002242987.

(Continued)

*Primary Examiner* — Robert T Clarke, Jr.
(74) *Attorney, Agent, or Firm* — Studebaker & Brackett PC

(57) ABSTRACT

A method and apparatus for providing a game are provided. According to embodiments of the present, the method for providing a game comprises determining a map for game play, variably determining a first area in the map, and providing a second play environment different from a first play environment of the first area to outside the first area, wherein an item or vehicle is not spawned or a spawn rate of the item or vehicle is lower than the first play environment in the second play environment. According to the method, an In-Game play environment is variably provided each time a game is played, thereby the unexpectedness of the game play can be enhanced and the utilization and lifespan of the game map can be remarkably improved.

14 Claims, 16 Drawing Sheets

100

(a) WHEN T = T1

(b) WHEN T = T2
(HERE, T1 < T2)

(56) References Cited

OTHER PUBLICATIONS

An Office Action mailed by the Korean Intellectual Property Office dated Oct. 20, 2021, which corresponds to Korean Patent Application No. 10-2020-0005692 and is related to U.S. Appl. No. 17/201,746 with English language translation.

A Notice of Allowance mailed by the Korean Intellectual Property Office dated Nov. 25, 2022 , which corresponds to Korean Patent Application No. 10-2020-0005692 and is related to U.S. Appl. No. 17/201,746.

* cited by examiner (c)

(b)

(a)

100

(a) WHEN T = T1

(b) WHEN T = T2
(HERE, T1 < T2)

METHOD AND APPARATUS FOR PROVIDING A GAME WITH ENHANCED UNEXPECTEDNESS

CROSS-REFERENCE SECTION

This application claims the benefit of Korean Patent Application No. 10-2020-0005692 filed on Jan. 16, 2020, in the Korean Intellectual Property Office, the disclosure of which is incorporated herein by reference in its entirety.

BACKGROUND

1. Field

The present invention relates to a method and apparatus for providing a game. More specifically, the present invention relates to a method and apparatus for providing a game, in which an In-Game play environment is variably provided each time a game is played to enhance the unexpectedness of game play.

2. Description of the Related Art

A game of Battle Royale genre refers to a survival-type game, in which users compete with each other within a limited space of the game map, and the user who survives to the end becomes the winner. In the game of the Battle Royale genre, users compete for survival using various objects, items, or vehicles around them, and sometimes use the terrain to preempt an advantageous position, so that users play the game with a high degree of freedom in an environment similar to real life.

Implementing the game map realistically in such a game of the Battle Royale genre is very important as a key factor that determines the competitiveness of the game. In order to make the game map more realistic, it is necessary to examine the actual terrain that is the model of the game map several times and implement it in detail, while carefully reflecting various realistic elements on the terrain in the game map to ensure high degree of freedom of play. Therefore, it takes a lot of time, effort, and cost to develop a single game map.

On the other hand, even a game map developed with such a large amount of time and cost does not take much time for users to consume the content. Users share tips and strategies for new game maps, get used to the new map very quickly, and it takes only a month or two for users to consume even game maps developed over one year.

Furthermore, there is a problem in that if a game map developed for a long time does not meet the preferences of users, the game map is not selected by the users and becomes dead, which causes enormous time and cost for development to be wasted.

SUMMARY

A technical problem to be solved through some embodiments of the present invention is to provide a game providing method and apparatus, in which an In-Game play environment is variably provided each time a game is played to enhance the unexpectedness of game play.

Another technical problem to be solved through some embodiments of the present invention is to provide a game providing method and apparatus, in which users are induced to use various regions of the game map in various ways to slow down the rate, at which content is consumed, and increase the lifespan of the game map.

Another technical problem to be solved through some embodiments of the present invention is to provide a game providing method and apparatus, in which various random elements are applied to the game map to prevent the game play method from being standardized and increase the dynamics of the map with low user preference, thereby improving utilization of the overall game map.

The technical problems of the present invention are not limited to the technical problems mentioned above, and other technical problems that are not mentioned will be clearly understood by those skilled in the art from the following description.

According to some embodiments of the present invention, a method for providing a game is performed by a computing device and comprises determining a map for game play, variably determining a first area in the map, and providing a second play environment different from a first play environment of the first area to outside the first area, wherein an item or vehicle is not spawned or a spawn rate of the item or vehicle is lower than the first play environment in the second play environment.

According to some embodiments of the present invention, a method for providing a game is performed by a computing device and comprises determining a map for game play, variably determining a first area in the map, and providing a second play environment different from a first play environment of the first area to outside of the first area, determining a second area including at least a portion of the first area and providing a third play environment different from the first play environment to outside of the second area.

According to some embodiments of the present invention, a method for providing a game is performed by a computing device and comprises determining a plurality of environment variable value sets, randomly selecting a first environment variable value set to be applied to a game map from the plurality of environment variable value sets, and determining an attribute of an object appearing on the game map based on the first environment variable value set.

According to some embodiments of the present invention, an apparatus for providing a game comprises a processor, a memory for loading a computer program executed by the processor, and a storage for storing the computer program, wherein the computer program comprises instructions for performing operations comprising determining a map for game play, variably determining a first area in the map, and providing a second play environment different from a first play environment of the first area to outside of the first area, wherein an item or vehicle is not spawned or a spawn rate of the item or vehicle is lower than the first play environment in the second play environment.

According to some embodiments of the present invention, a computer program coupled to a computing device for executing a method for providing a game is stored in a computer-readable medium to conduct determining a map for game play, variably determining a first area in the map, and providing a second play environment different from a first play environment of the first area to outside of the first area, wherein an item or vehicle is not spawned or a spawn rate of the item or vehicle is lower than the first play environment in the second play environment.

DETAILED DESCRIPTION

Figure 1:
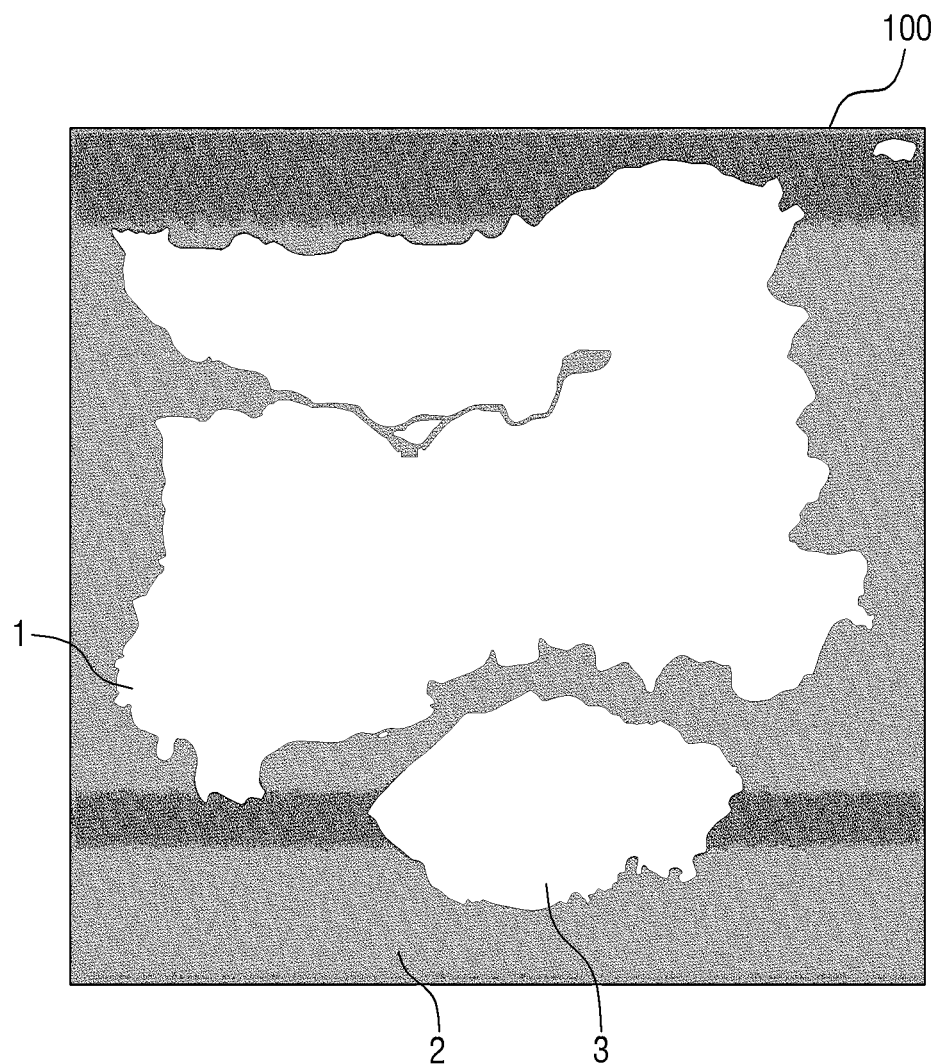
FIG. 1 is a diagram showing an exemplary form of a game map used in a game of the Battle Royale genre.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present invention, when it is determined that the detailed description of the related well-known configuration or function may obscure the gist of the present invention, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the invention. In this specification, the singular also includes the plural unless specifically stated otherwise in the phrase.

In addition, in describing the component of this invention, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

When "comprises" and/or "comprising" is used in the present invention, it does not exclude that one or more other components, steps, operations and/or elements are added to forementioned component, step, operation and/or element.

Hereinafter, various embodiments of the present invention for solving the above-described technical problem will be described.

FIG. 1 is a diagram showing an exemplary form of a game map used in a game of the Battle Royale genre.

In the Battle Royale genre, users move autonomously around the map, collect items, weapons, and vehicles they need, and use them to compete with other users. The map may include continents 1, seas 2, islands 3, and the like, similar to the actual terrain, and various terrain features and covers such as mountains, hills, buildings, rocks, trees, etc. may be implemented.

In general, in the game map of the Battle Royale genre, the characteristics of the map are unique, and accordingly, the way users play is somewhat standardized. Taking 'Battleground' as an example of a representative game of the Battle Royale genre, 'Erangel' map has a large map size and low item spawn rate, so the frequency of battles is low and the overall play tempo is slow. Meanwhile, 'Sanok' map has a small map size and a high spawn rate of items, so the frequency of battles is high, and the play tempo is also fast. As such, as each map has its own characteristics, there is an optimized movement route or play method, and users repeat only similar play in the same place each time accordingly, so that the overall play method is standardized and the utilization of the map decreases.

In the present invention, in order to solve this problem, even if the same game map is played, different In-Game play environments are provided at random each time, thereby enhancing the unexpectedness of game play and preventing standardization of game play.

Furthermore, through this, it intends to eliminate the concentration of play on a specific map or a specific place in the prior art, induce play in various regions of various maps, and increase the overall utilization and lifespan of the game map.

Hereinafter, various embodiments of the present invention will be described in detail with reference to the accompanying drawings.

Figure 2:
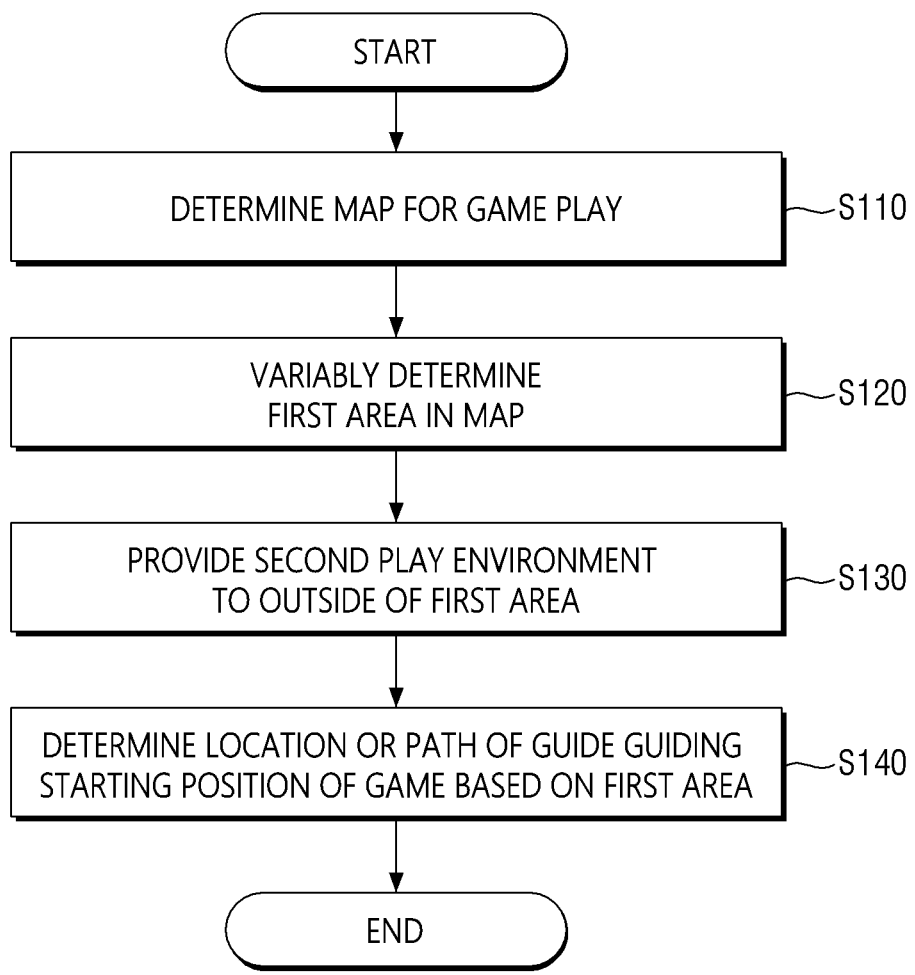
FIG. 2 is a flowchart illustrating a method of providing a game according to some embodiments of the present invention.

FIG. 2 is a flowchart illustrating a method of providing a game according to some embodiments of the present invention. Referring to FIG. 2, the game providing method according to this embodiment variably determines a specific area on the game map and provides a play environment different from other areas based on the determined area to induce users to play centering on a specific area.

The game providing method according to the present embodiment may be performed by, for example, a game providing device that can be implemented with the computing device 500 illustrated in FIG. 17. When a performing subject is not specified for the steps described below, it is assumed that the performing subject is the game providing device.

In step S110, the game providing device determines a map for game play. In this case, the game providing device may determine the map by the user's selection, or may determine the map by itself according to a predetermined rule or randomly. For example, when there are a first map, a second map, and a third map as a game map, the game providing device may determine a map selected by the user as a map for game play, determine a map for game play by randomly selecting any one of the first map, the second map, and the third map, or determine a map for game play by sequentially selecting any one of the first map, the second map, and the third map.

In step S120, the game providing device variably determines the first area in the previously determined map. Here, the term 'variably' means that the first area is determined differently each time a game is played, and includes the concept, in which the first area is determined by randomly partitioning a random area in the map at the start of the game, the first area is determined by randomly selecting any one of a plurality of predetermined areas, or the first area is determined by selecting any one of a plurality of predetermined areas according to a predetermined rule.

In step S130, the game providing device provides different play environments to the inside and outside of the first area based on the first area. That is, a first play environment is provided to the first area and a second play environment different from the first play environment is provided to the outside of the first area, thereby inducing users to naturally play centering on any one side of them.

For example, if a play environment that is worse than the inside of the first area is provided to the outside of the first area, users will try to play only in the first area without going outside the first area as much as possible. For example, when the play environment is configured such that items or vehicles are not spawned outside the first area, or the spawn rate of items or vehicles is significantly lower than the inside of the first area, users will play centering on the first area as much as possible for item farming. Alternatively, when the play environment is configured to continuously inflict damage to users playing outside the first area over time, the users will not go outside the first area to avoid damage and stay only inside the first area. As described above, by providing a more inferior play environment to outside of the first area, it is possible to induce users to the inside of the first area.

On the other hand, although it is illustrated here that a penalty is applied to any one side based on the first area to configure an inferior play environment, a complementary embodiment with this is also possible. For example, it is also possible to induce users into the first area by giving an advantage to the inside of the first area instead of applying a penalty to the outside of the first area.

In this way, when users are induced to a specific area (first area), it becomes possible to widely use the game map. If the same play environment is provided for the entire map, users will concentrate on playing only in some areas where the terrain is advantageously formed, and the remaining areas are discarded without being well utilized. However, as in the present embodiment, if the play environment is differentially provided on the basis of a specific region, even if the region determined as the first area is a region that was not previously preferred, due to the differentially provided play environment, the users play in the corresponding area, and if various places on the map are variably designated as the first area each time the game is played, the entire area of the map can be effectively utilized without being discarded. Furthermore, as strategies and tactics tailored to the region designated as the first area can be used, different strategies and tactics appear for each game, thereby slowing down the overall content consumption rate of the game map and substantially increasing the life of the game map.

In step S140, the game providing device determines a location or path of a guide guiding a game starting position based on the first area. Step S140 is a step that is applied only in an embodiment, in which there is a guide for guiding the game starting position. In an embodiment without such a guide, step S140 may be omitted.

This is to form the user's game starting position centering on the first area. In this embodiment, since an environment suitable for game play is created centering on the first area, the game starting position is placed in or around the first area, thereby enabling active game play from the beginning. A specific embodiment of determining the location or path of the guide will be described later in detail with reference to FIG. 6.

Figure 3:
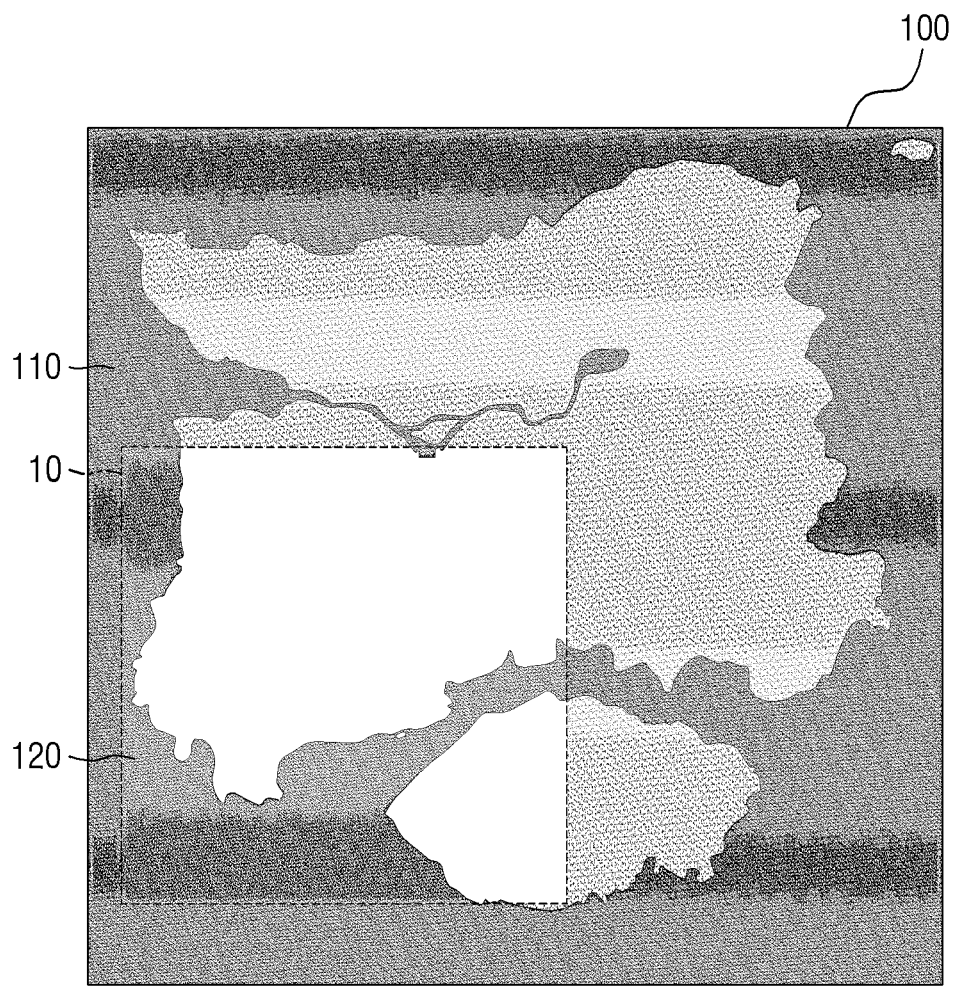
FIG. 3 is a diagram for describing a method of differentially providing a game play environment by variably selecting a first area of a game map according to an embodiment of the present invention.

FIG. 3 is a diagram for describing a specific embodiment of differentially providing a game play environment by selecting a first area in a game map. Referring to FIG. 3, an example of selecting and determining some area of the map 100 as the first area 10 is shown.

As described above, different play environments are provided to the outside area 110 and the inside area 120 of the first area based on the first area 10 even in the region within the same game map 100. That is, in order to induce play in the first area 10, a play environment inside area 120 of the first area 10 (first play environment) may be relatively advantageously provided, or a play environment outside area 110 of the first area 10 (second play environment) may be relatively disadvantageously provided. For example, in the outside area 110 of the first area 10, the second play environment may be configured so that an item or vehicle is not spawned, the damage is continuously inflicted to the user over time, or they are overlapped and applied. Alternatively, when it is desired to more extremely limit the activity radius of users, the outside area 110 of the first area 10 may be set as an unplayable area, in which entry itself is impossible.

As an example, the location or size of the first area 10 may be determined based on a characteristic or area of the terrain included in the first area 10. In general, among the terrain of the game map 100, in the case of high mountainous or sea terrain, there is a portion, in which the user's play is not smooth compared to the flat or shallow hilly terrain. Therefore, it is necessary to adjust the proportion so that the first area 10 does not include too much high mountainous terrain or sea terrain. For example, if the first area 10 includes too much sea terrain, the first area 10 may be determined again by moving the location of the first area 10 toward the land so that the sea terrain decreases and the land terrain increases. Similarly, when the first area 10 includes too much high mountainous terrain, the first area may be determined again by moving the location of the first area 10 toward the plain or low hilly terrain so that the high mountainous terrain decreases and the plain or low hilly terrain increases.

Alternatively, if the first area 10 includes too much sea terrain, the first area 10 may be determined again by expanding the size of the first area 10 so that the first area 10 includes more land terrain, and similarly, if the first area 10 includes too much high mountainous terrain, the first area 10 may be determined again by expanding the size of the first area 10 so that the first area 10 includes more plains or low hilly terrain.

Alternatively, if the first area 10 includes too much sea terrain, the first area 10 may be determined again by reducing the size of the first area 10 so that the first area 10 includes less sea terrain, and similarly, if the first area 10 includes too much high mountainous terrain, the first area 10 may be determined again by reducing the size of the first area 10 so that the first area 10 includes less high mountainous terrain.

As an embodiment, if the first area 10 is determined once at the beginning of the game, the size or location of the first area 10 does not change within the In-Game. If the first area 10 changes after the game starts, it may infuse dynamics in the game play, but it may cause great confusion in the strategies and tactics of the users, so it is to prevent this concern. This is also because the addition of dynamics is sufficiently achievable only with the "Bluezone" to be described later in FIG. 7.

As an exemplary embodiment, the outside area 110 of the first area 10 may be displayed in a different color from the inside area 120 of the first area 10 to indicate that it is a penalty area, in which an unfavorable play environment is created. Here, it is assumed that the outside area 110 of the first area 10 is displayed in dark blue, and the outside area 110 of the first area 10 is referred to as "Outer Bluezone" in a sense that distinguishes it from the "Bluezone" to be described later in FIG. 7.

Figure 4:
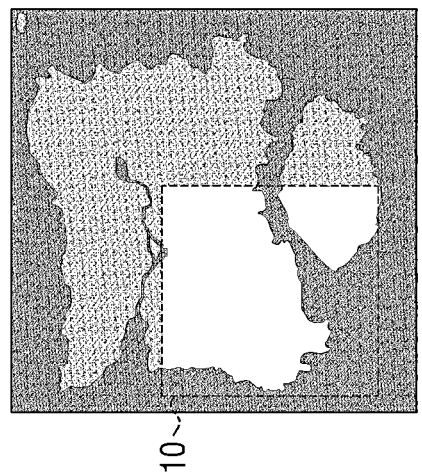
FIG. 4 is a diagram illustrating various exemplary methods of variably selecting a first area.
Figure 4:
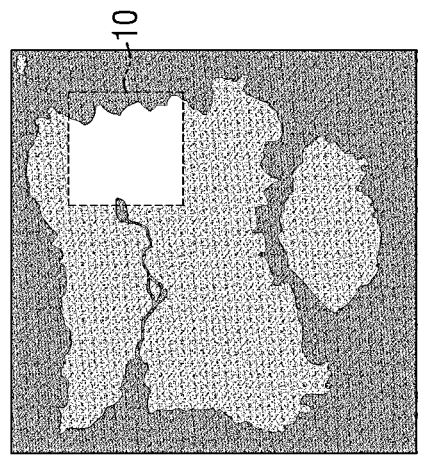
Figure 4:
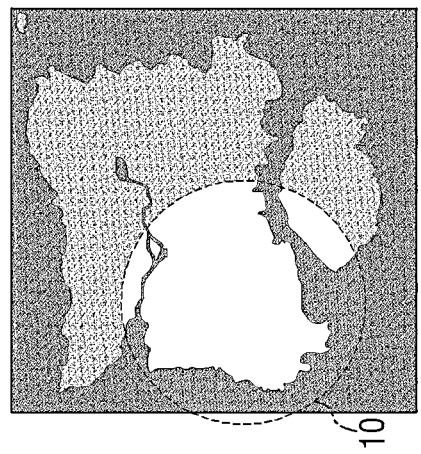

FIG. 4 is a diagram illustrating various exemplary methods of variably selecting a first area. Even for the same map 100, the size, shape, or location of the first area 10 may be determined differently at the start of each game.

For example, as shown in FIG. 4(*a*), the first area 10 may be determined as a relatively large area, or as shown in FIG. 4(*b*), the first area 10 may be determined as a relatively small area.

Alternatively, as shown in FIG. 4(*a*), the first area 10 may be determined in a square shape, or as shown in FIG. 4(*c*), the first area 10 may be determined in a circular shape.

Alternatively, as shown in (a), (b), and (c) of FIG. 4, the first area 10 may be determined so that the first area 10 is formed at a different location each time.

The size, shape, or location of the first area 10 is not limited to those illustrated here, and may be freely determined in various other sizes, shapes, or locations.

Figure 5:
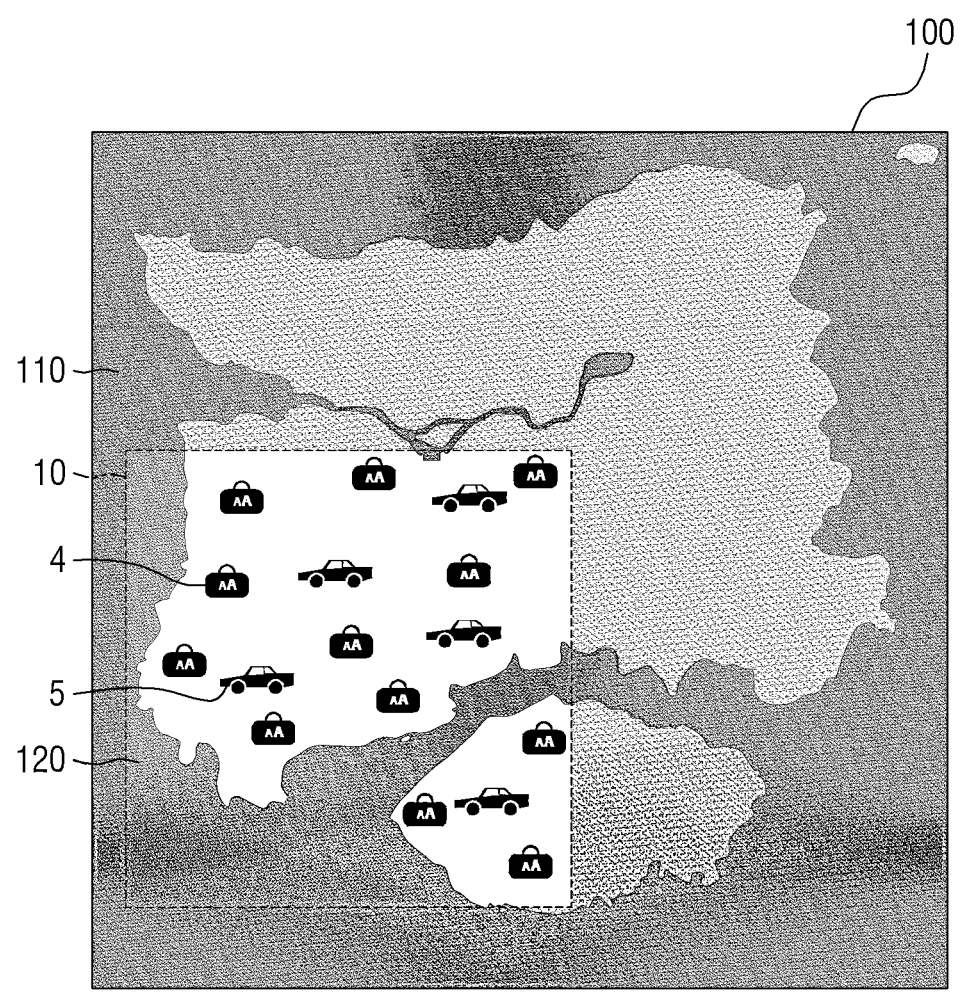
FIG. 5 is a diagram illustrating adjusting a spawn rate of an item or vehicle as an example of a method of differentially providing a game play environment based on a first area.

FIG. 5 is a diagram illustrating an embodiment, in which the spawn rate of an item or vehicle changes based on the first area. As described above, when the first area 10 is determined, the item 4 or the vehicle 5 is normally spawned in the inside area 120 of the first area 10 in order to induce the user's play to the first area 10, but it is possible to prevent an item or vehicle from being spawned outside area 110 of the first area 10 (i.e., it is possible to prevent an item or vehicle from being spawned from Outer Bluezone).

In addition to the primary effect of inducing users to the first area 10, this embodiment may further exert an additional effect of reducing system resource consumption. In the game of the Battle Royale genre, a very large number of items and vehicles are spawned in the game map 100. Information on spawned items and vehicles is transmitted to the terminals of each user participating in the game, and due to the nature of the Battle Royale genre, in which more than 100 people participate at a time, considerable system resources are consumed even to transmit item and vehicle information. Therefore, according to the present embodiment, if an item or vehicle is not spawned in the outside area 110 of the first area 10 (i.e., if an item or vehicle is not spawned in the Outer Bluezone), it is possible to reduce the consumption of system resources required for information transmission.

Furthermore, this may contribute to enhancing the game performance experienced by users. As described above, if items or vehicles are not spawned in the outside area 110 of the first area 10 (i.e., if an item or vehicle is not spawned in the Outer Bluezone), the system resources required for information transmission are reduced, so that the game can be serviced more smoothly at the server level, and at the individual terminal level of the user, items or vehicles are not rendered in the outside area 110 of the first area 10 (i.e., items or vehicles are not rendered in the Outer Bluezone), so the required graphics processing amount is reduced, and the game can run more smoothly.

On the other hand, as the same as described above, an additional penalty (e.g., inflicting damage to the user over time, etc.) is overlapped and applied to the outside area 110 of the first area 10 (i.e., an additional penalty is overlapped and applied to the Outer Bluezone), or the outside area 110 of the first area 10 (i.e., an additional penalty is overlapped and applied to the Outer BlueZone) may be set as an unplayable area, in which entry itself is impossible.

Figure 6:
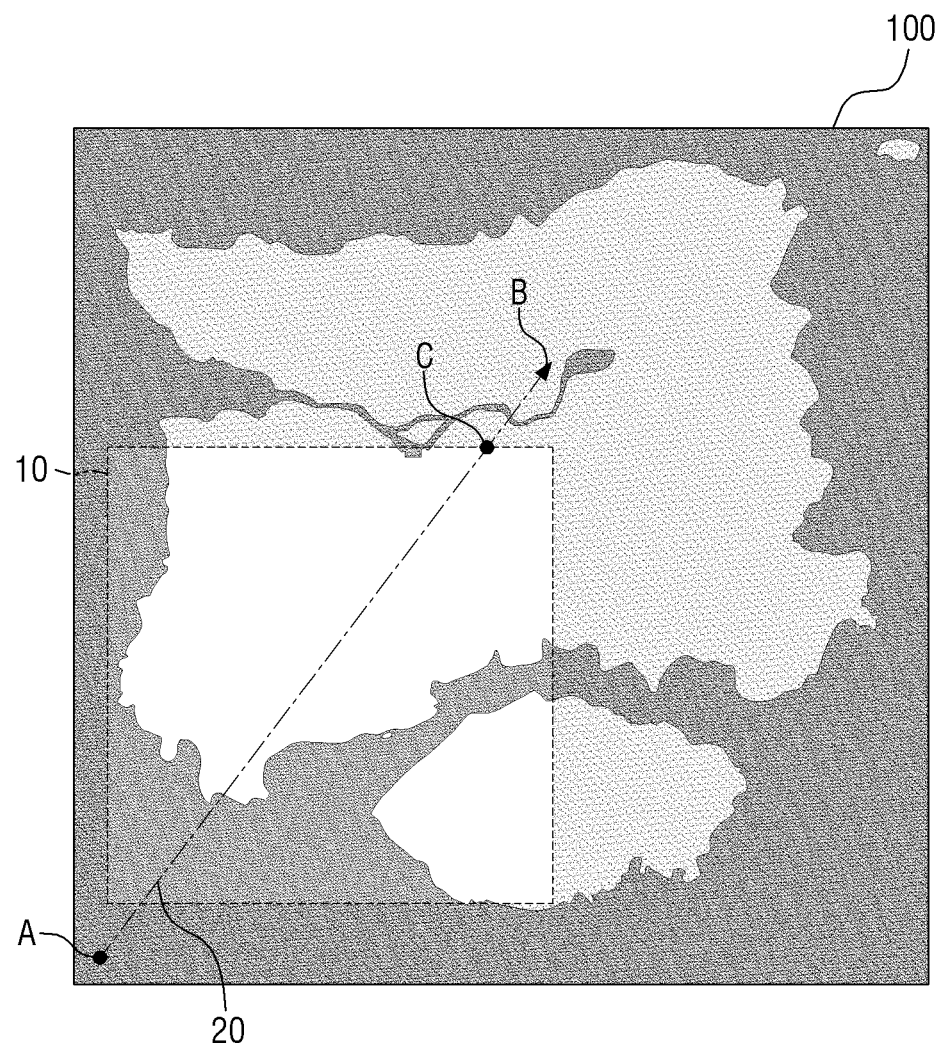
FIG. 6 is a diagram for describing an exemplary method of determining a location or a path of a guide guiding a starting position of a game play based on a first area.

FIG. 6 is a diagram for describing an exemplary method of determining a location or a path of a guide guiding a starting position of a game play based on the first area.

Here, it is exemplified that a guide guides users along a predetermined path 20, but the scope of the present invention is not limited thereto. For example, the guide may be configured to guide users to several discontinuous fixed points within the first area 10.

In this embodiment, the location or path of the guide may be determined depending on the first area 10. This is to form the user's game starting position centering on the first area 10, for example, the guide's moving path 20 is determined as a path passing through the first area 10 as shown in FIG. 6. At this time, the guide's starting point A or arrival point B may be determined as a position where the movement path 20 passes through the center of the first area 10 so that the guide passes through the first area 10 as long as possible.

According to this, by guiding the game starting position of each user into the first area 10, in which an environment suitable for game play is created, it is possible to induce active game play from the beginning.

As an embodiment, the guide may be a carrier that carries users along a predetermined path 20. For example, the guide carries the users as a vehicle such as an airplane, vehicle, or ship, and while the guide moves along the path 20, the game starting position of each user may be guided in such a way that the user moves away from the guide at a desired time point.

As an embodiment, when there is a user who does not deviate from the guide until the guide leaves the first area 10, the user may automatically leave the guide at a point C that leaves the first area 10. This is to allow the user to start the game near the first area 10 even when the user accidentally misses the departure timing.

Figure 7:
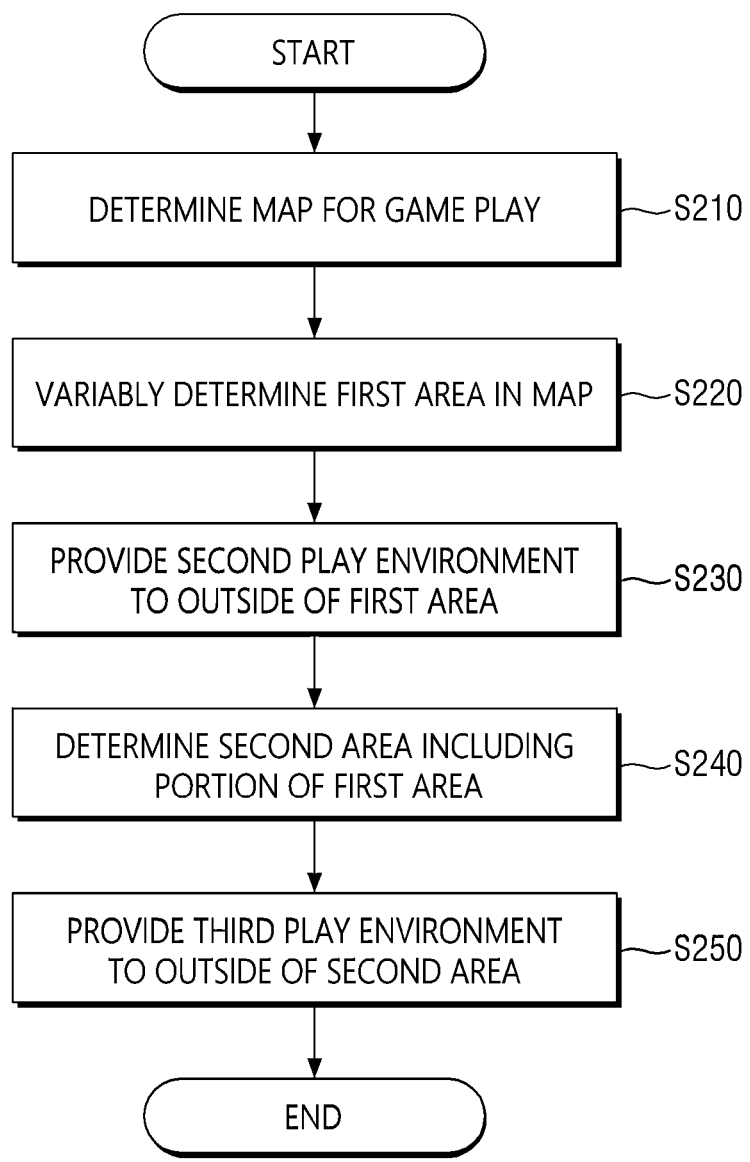
FIG. 7 is a flowchart illustrating a method of providing a game according to other exemplary embodiments of the present invention.

FIG. 7 is a flowchart illustrating a method of providing a game according to another exemplary embodiment of the present invention. The embodiment of FIG. 7 has some similar parts to the embodiment described with reference to FIG. 2. For example, steps S210 to S230 of FIG. 7 refer to steps substantially the same as steps S110 to S130 of FIG. 2. However, the embodiment of FIG. 7 is different in that a second area (or "Bluezone") is further included in order to add dynamics to the game play after the game starts. Here, detailed descriptions of contents that are substantially the same as or overlapped with the description of FIG. 2 will be omitted for simplicity of description.

In step S210, the game providing device determines a map for game play. In this case, the game providing device may determine the map by the user's selection, or may determine the map by itself according to a predetermined rule or randomly.

In step S220, the game providing device variably determines the first area in the previously determined map.

In step S230, the game providing device provides different play environments to the inside and outside of the first area based on the first area. That is, a first play environment may be provided to the inside of the first area, and a second play environment different from the first play environment may be provided to the outside of the first area.

In step S240, the game providing device determines a second area including at least a portion of the first area. The second area is for further narrowing or inducing an activity area of users within the first area, and in this sense, the second area is determined to include at least a portion of the first area. In this case, unlike the first area, the second area may be set as an area whose size or location changes in the In-Game over time. This will be described in more detail later in FIG. 9.

In step S250, the game providing device provides a third play environment different from the play environment of the first area to the outside of the second area. Since the second area is for further narrowing the active area of users in the first area, the third play environment is configured as an environment inferior to the play environment (first play environment) in the first area. For example, the third play environment may be configured as an environment, in which the spawn rate of items or vehicles is low, or damage is inflicted to the user over time, like the second play environment described above.

According to this, if it falls the outside of the second area, a penalty (for example, the spawn rate of an item or vehicle is low, or damage is inflicted to the user over time) is applied to the user even within the first area, so that users are induced to the common area without penalty of the first area and the second area, and accordingly, the active area of the users can be further narrowed from the first area to the common area. Through this, while securing additional dynamics in game play, faster battle occurrence can be expected.

Figure 8:
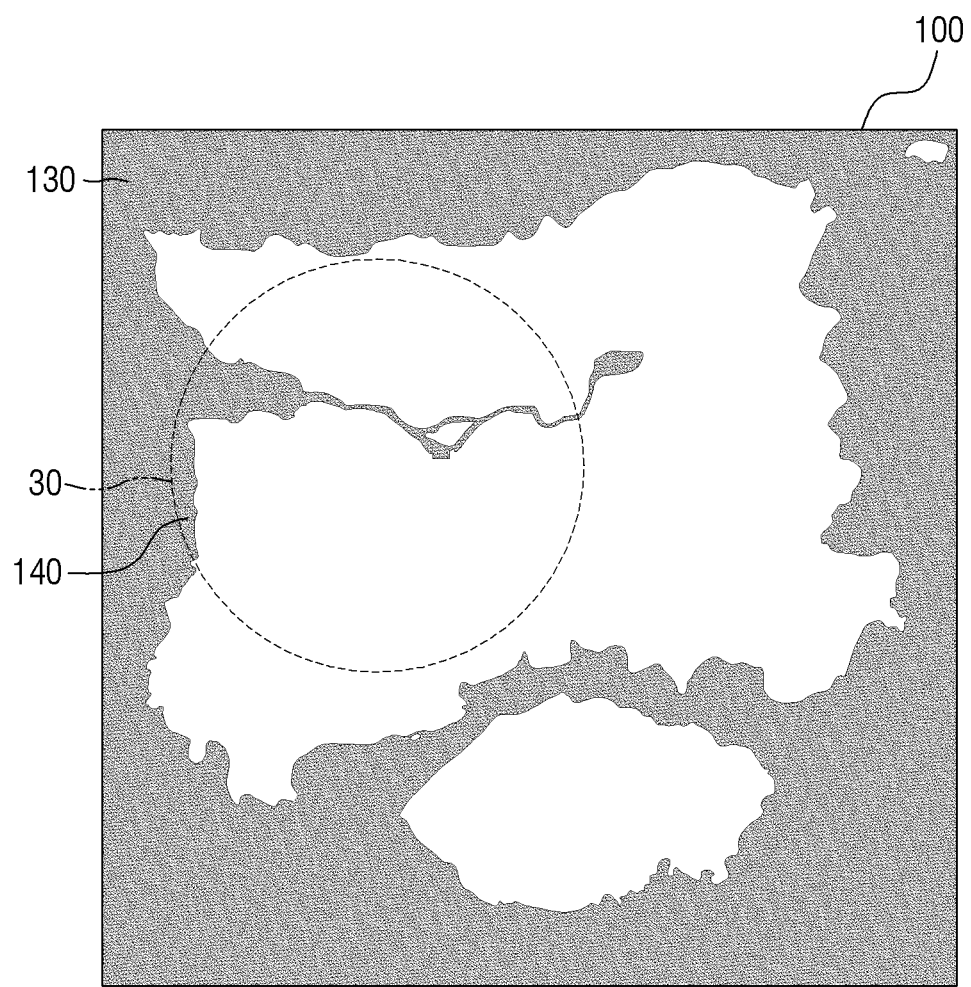
FIGS. 8 and 9 are diagrams for describing an exemplary form of a second area according to an embodiment of the present invention.
Figure 9:
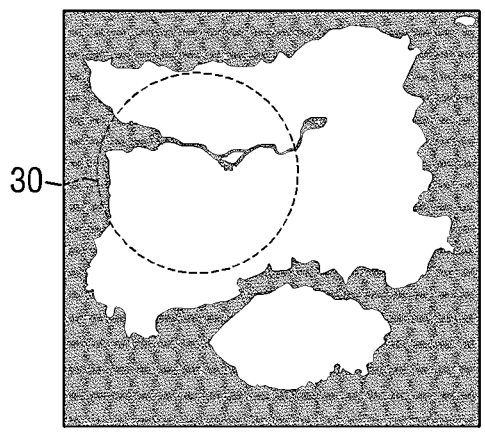
Figure 9:
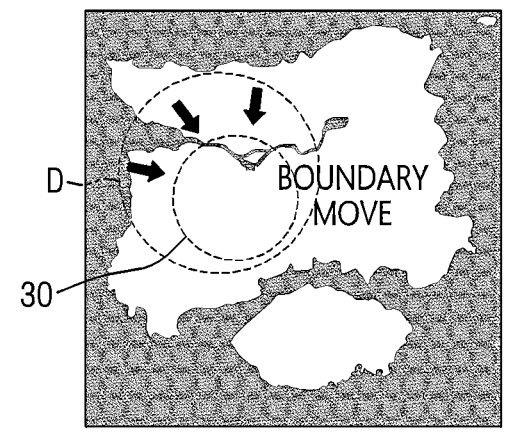

FIGS. 8 and 9 are diagrams for describing an exemplary shape of the second area according to an embodiment of the present invention.

Referring to FIG. 8, it can be seen that the second area 30 is displayed in an arbitrary area on the map 100. As described with reference to FIG. 7, different play environments may be provided to the inside area 140 and the outside area 130 of the second area based on the second area 30. For example, a play environment (a third play environment), in which a predetermined penalty is given, may be provided to the outside area 130 of the second area 30. In FIG. 8, the second area 30 is illustrated as having a circular shape, but the scope of the present embodiment is not limited thereto. For example, the second area 30 may have a shape other than a circle, such as a square, a triangle, an asterisk, or other irregular shape.

FIG. 9 is a diagram for describing an embodiment, in which the second area 30 is first determined on the map 100 and then its size or location changes over time.

Even if the second area 30 is determined at the first time point (t=t1) as shown in FIG. 9(a), when reaching the second time point (t=t2, t1<t2) after time passes, as shown in FIG. 9(b), the boundary is reduced in the existing second area 30, so that a new second area 31 may be determined. In this case, the new second area 31 may be determined to be located within the existing second area 30.

As an embodiment, the change of the second area 30 may be performed based on various parameters such as delay time, waiting time, moving time, or a size ratio. Here, the delay time is time delayed until the display of the new second area 31 in advance after the second area 30 is determined, and the waiting time is time to wait until the reduction to the new second area 31 actually starts after displaying the new second area 31 in advance, and the moving time is time taken to complete after the reduction to the new second area 31 starts, and the size ratio is a value indicating the ratio of how small the size of the second area 30 becomes before and after the change.

As an embodiment, the third play environment may also change according to the change of the second area 30. For example, when the second area 30 changes, the third play environment may change in a manner that the degree of a penalty applied by the third play environment also increases.

Table 1 below is a table showing parameters related to the second area 30. In the table below, 'phase' refers to the stage of the second area 30. In the In-Game, when the second area 30 is first determined, it is phase 1, and when it changes once after that, it is phase 2, and thereafter, when it changes once more, it becomes phase 3. As such, the phase of the second area 30 changes, and the value of the applied parameter may be changed accordingly.

TABLE 1

| Phase | Phase 1 | Phase 2 | Phase 3 | Phase 4 | Phase 5 |
| --- | --- | --- | --- | --- | --- |
| Delay time | 90 | 80 | 70 | 60 | 50 |
| Waiting time | 170 | 150 | 130 | 110 | 90 |
| Moving time | 120 | 120 | 120 | 90 | 90 |
| Size ratio | 0.5 | 0.5 | 0.5 | 0.5 | 0.5 |
| Penalty degree | 0.4 | 0.5 | 0.6 | 0.7 | 0.8 |

Figure 10:
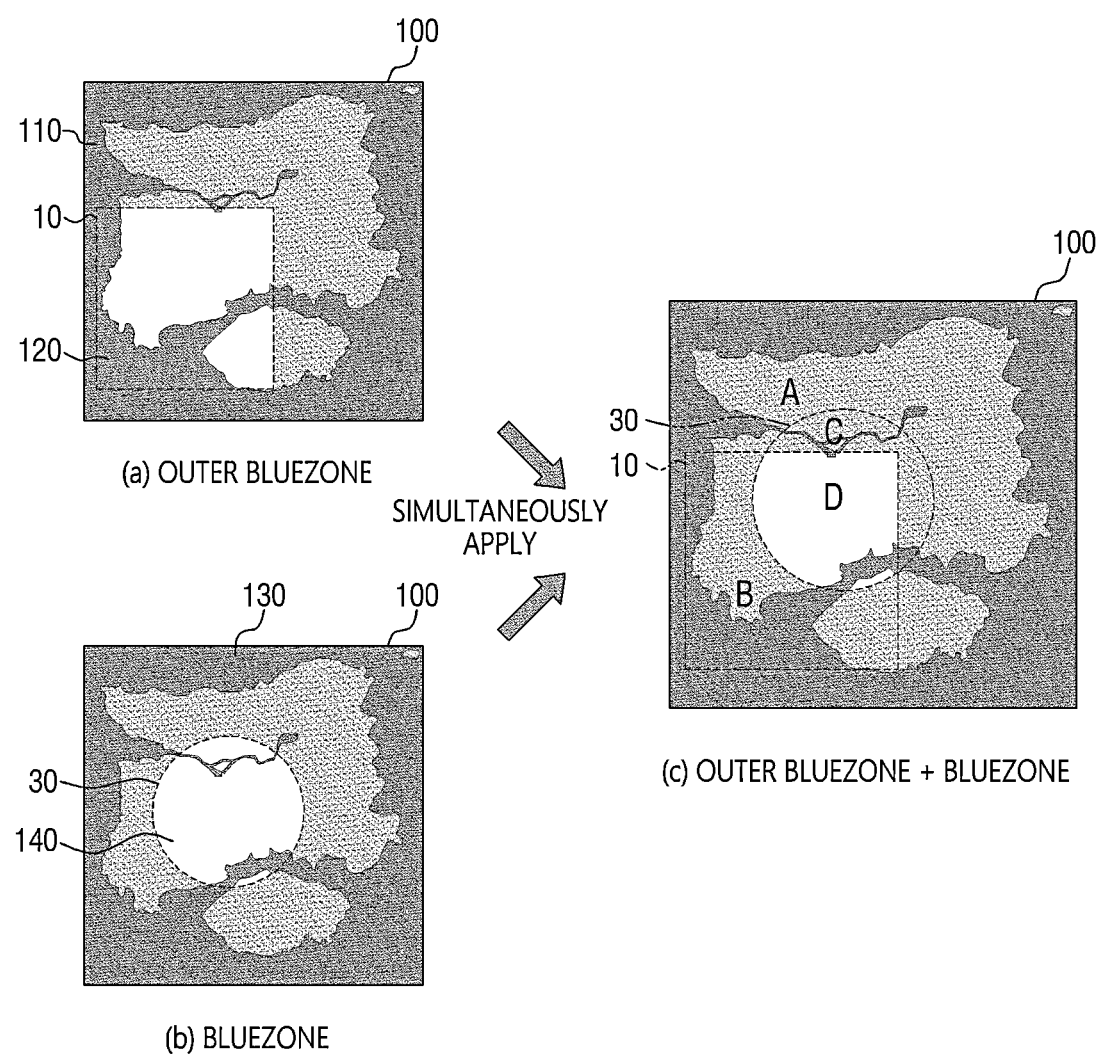
FIG. 10 is a diagram for describing an exemplary form, in which a first area and a second area are simultaneously applied to a game map, and a correlation relationship between the first area and the second area at that time.

FIG. 10 is a diagram for describing an exemplary form, in which a first area and a second area are simultaneously applied to a game map, and a correlation relationship between the first area and the second area at that time.

Referring to FIG. 10, an example, in which the first area 10 is applied to the map 100, is shown in FIG. 10(a), and an example, in which the second area 30 is applied to the map 100, is shown in FIG. 10(b), and an example, in which the first area 10 and the second area 30 are simultaneously applied to the map 100, is shown in FIG. 10(c).

In FIG. 10(a), a first play environment with no special penalty is provided as a normal play area to the inside area 120 of the first area 10, and a second play environment, in which various penalties (first penalty) described above are applied, is provided to the outside area 110 of the first area 10 (i.e., a second play environment, in which various penalties (first penalty) described above are applied, is provided to the Outer Bluezone).

Similarly, in FIG. 10(b), a first play environment with no special penalty is provided as a normal play area to the inside area 140 of the second area 30, and a third play environment, in which various penalties (second penalty) are also applied, is provided to the outside area 130 of the second area 30 (i.e., a third play environment, in which various penalties (second penalty) are also applied, is provided to the Bluezone). The first penalty and the second penalty may be the same or different.

In FIG. 10(c), the first area 10 and the second area 30 are simultaneously applied. Accordingly, a second play environment, in which a first penalty is applied, is provided to the outside of the first area 10 (Outer Bluezone), and a third play environment, in which a second penalty is applied, is provided to the outside of the second area 30 (Bluezone). The second play environment and the third play environment may be overlapped each other and provided.

For example, since area A of the map 100 corresponds to both the Outer Bluezone and the Bluezone, the second play environment and the third play environment are overlapped and applied to the area A (that is, the first penalty and the second penalty are applied simultaneously). Since the area B of the map 100 corresponds only to the Bluezone, the third play environment is applied to the area B (that is, only the second penalty is applied). Since area C of the map 100 corresponds only to the Outer Bluezone, the second play environment is applied to the area C (that is, only the first penalty is applied). Since area D of the map 100 does not correspond to either the Outer Bluezone or the Blue zone, the first play environment is applied to the area D and no penalty is applied.

As an embodiment, in FIG. 10, the first area 10 is an area that is determined at the start of the game and does not change within the In-Game, and the second area 30 is determined in the In-Game after the game starts, and may be an area that continuously changes as the game progresses, as described in FIG. 9.

In this case, the user plays centering on the area (B+D) within the first area 10 at the beginning of the game, and after the second area 30 is determined, plays in the common area D of the first area 10 and the second area 30 for avoiding the Bluezone.

As an embodiment, the second area 30 may be determined to include at least a portion of the first area 10. If the first area 10 and the second area 30 are determined to be completely separated without overlapping portions, there is no penalty-free portion on the map 100, which causes the user to experience difficulty in playing. Therefore, in order to secure a playable area without penalty, the second area 30 is determined to include at least a portion of the first area 10, and preferably, the second area 30 is determined so that the center of the second area 30 is located in the first area 10, thereby including a relatively much portion of the second area 30 in the first area 10. Here, the center of the second area 30 means a point, at which the sum of distances between points of the boundary of the second area 30 is minimum.

Figure 11:
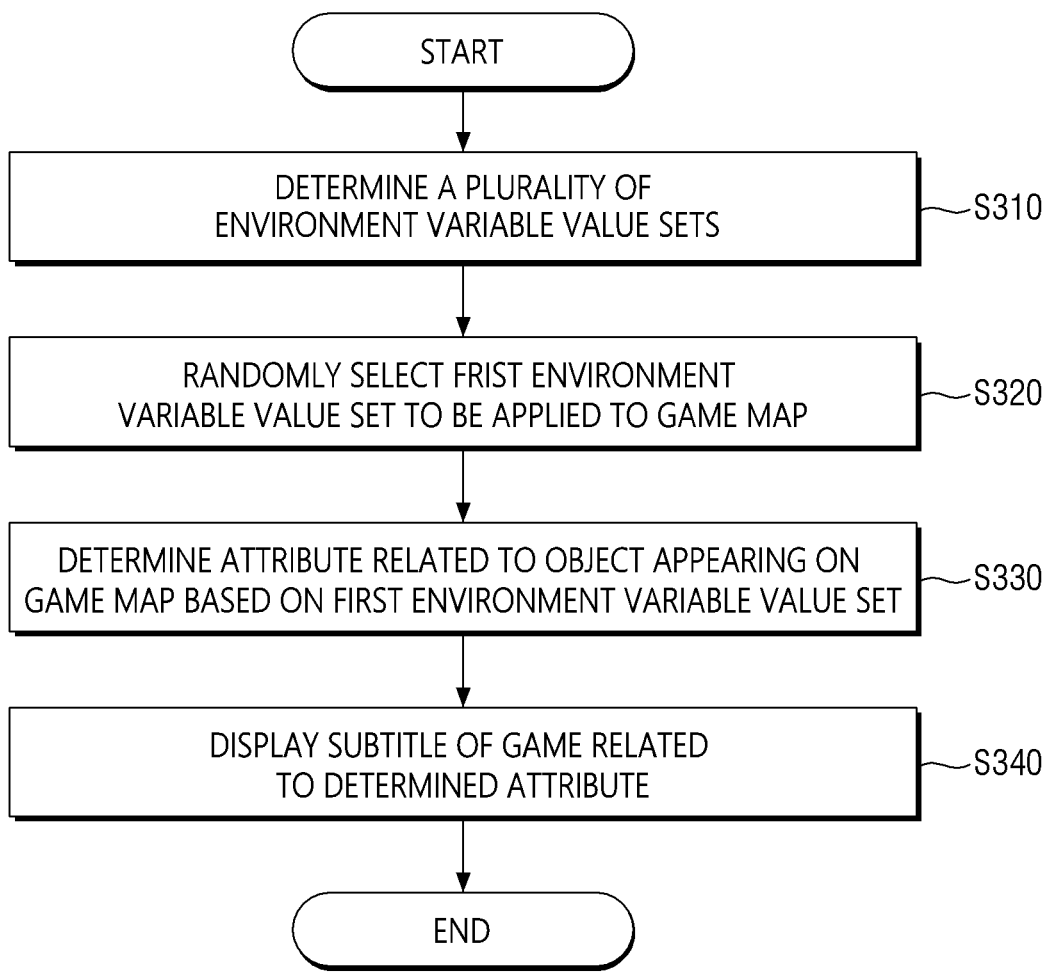
FIG. 11 is a flowchart illustrating a method of providing a game according to another exemplary embodiment of the present invention.

FIG. 11 is a flowchart illustrating a method for providing a game according to still another embodiment of the present invention. In FIG. 11, an embodiment of randomly determining environment variables of a game map and determining attributes related to objects appearing on the map based on the determined environment variables is described.

Figure 12:
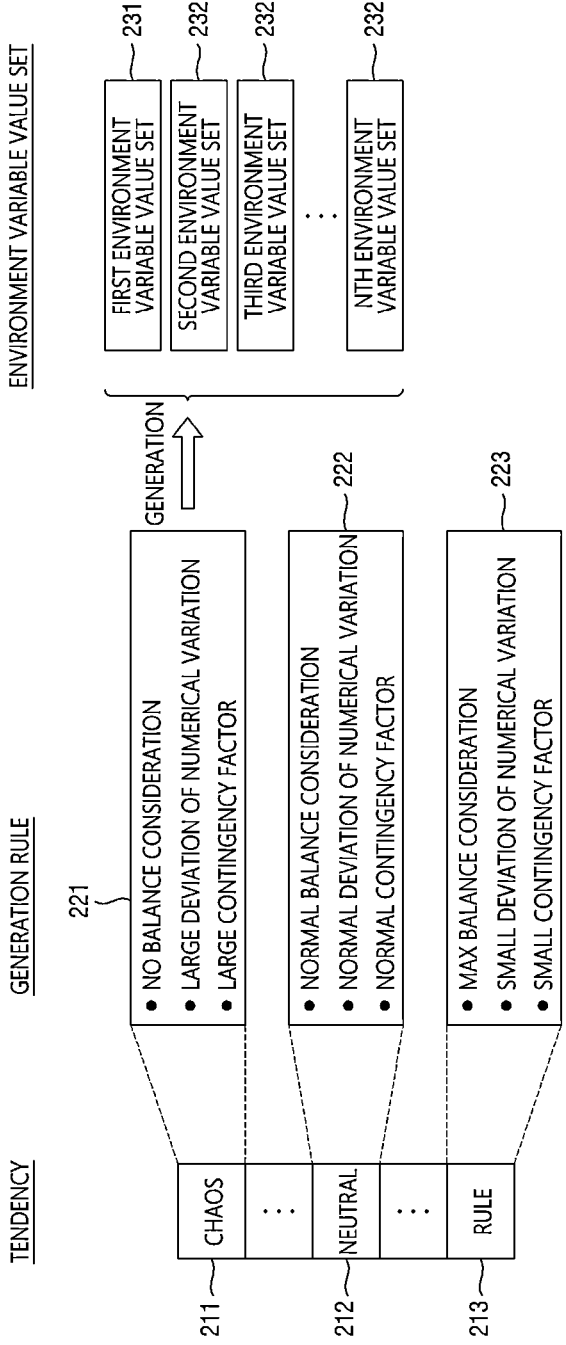
FIG. 12 is a diagram describing an exemplary method of determining a plurality of environment variable value sets according to an embodiment of the present invention.

In step S310, the game providing device determines a plurality of environment variable value sets according to a predetermined criterion. This will be described in detail with reference to FIG. 12. FIG. 12 is a diagram illustrating an exemplary method of determining a plurality of environment variable value sets.

Referring to FIG. 12, first, a tendency may be set in order to randomly generate an environment variable value set. The tendency may be set in a form, for example, such as chaos 211, neutral 212, or rule 213. The tendency is an indicator of the degree of variability and randomness to generate an environmental variable value set. For example, when the tendency is chaos 211, the deviation between the generated environment variable value sets will be large, and the variability and randomness of the environment variable value set will also increase. On the other hand, when the tendency is the rule 213, the deviation between the generated environment variable value sets is small, the variability and randomness of the environment variable value set ( 메모 : 세트 값 -> 세트 ) are small, and the environment variable value sets are generated relatively regularly. When the tendency is neutral 212, as a medium degree between the chaos 211 and the rule 213, environment variable value sets will be generated to have an average deviation, variability, and randomness.

Once the tendency is determined, the generation rule is determined based on the determined tendency. The generation rule is a specific generation rule that generates an environment variable value set, and reflects the previously determined tendency. For example, if the tendency is chaos 211, the generation rule 221 will be determined to increase the deviation of numerical variation as much as possible without considering the play balance, and to increase the contingency factor as much as possible. Similarly, even when the tendency is the neutral 212 or the rule 213, the respective generation rules 222 and 223 may be determined based thereon.

When the generation rule is determined, a plurality of environment variable value sets 231, 232, 233, and 234 are determined based on the determined generation rule. Environment variable value sets 231, 232, 233, and 234 are data including parameters representing attributes of various objects appearing on the map 100, and for example, a subset indicating the attribute of the Bluezone (that is, an object that applies a penalty to some areas of the game map in the In-Game and moves the boundary over time), a subset indicating the attribute of the item, a subset indicating the attribute of the vehicle, and the like may be included.

As an embodiment, the subset indicating the attribute of the Bluezone may include parameters for determining the size of the Bluezone, the degree of penalty applied by the Bluezone, the delay time of the Bluezone, the waiting time of the Bluezone, or the moving time of the Bluezone.

As an embodiment, the subset representing the attribute of the item or vehicle may include parameters for determining the class, type, state, spawn location, or spawn rate of the item or vehicle.

Referring back to FIG. 11, in step S320, the game providing device randomly selects a first environment variable value set to be applied to the game map 100 from among a plurality of the generated environment variable value sets.

In step S330, the game providing device determines an attribute related to an object appearing on the game map based on the selected first environment variable value set. In this case, the object may be Bluezone, a vehicle, or an item.

Since the first environment variable value set is randomly selected from among a plurality of environment variable value sets, when this is applied to an object, the attribute of the object appears randomly. For example, among a plurality of environment variable value sets, some may be set to have strong Bluezone damage, and some may be set to have weak Bluezone damage. Further, some may be set so that the change speed of the Bluezone is very fast and its change range is large, while others may be set so that the change speed of the Bluezone is slow and its change range is small. Depending on which one of such environment variable value sets is selected as the first environment variable value set, the attribute of the Bluezone appearing in the map 100 is randomly changed, thereby improving the unexpectedness of game play and diversifying the user experience of users.

Here, it has been illustrated that the attribute of the Bluezone is changed according to the selection of the first environment variable value set, but a similar method may be applied to the attribute of vehicles or items. For example, among a plurality of environment variable value sets, some may be set so that various types of vehicles or items are spawned in various places in the map 100, while others may be set so that only specific types of vehicles or items are spawned at specific points in the map 100. Also, some may be set so that items or vehicles are spawned in a complete state, while others may be set that items or vehicles are spawned in a state, in which they are damaged or have reduced durability. In this case, depending on which environment variable value set is selected as the first environment variable value set, the attribute of an item or vehicle is randomly changed so that various user experiences can be provided.

In step S340, the game providing device displays the subtitle of the game in relation to the previously determined attribute based on the first environment variable value set. Since factors that have an important impact on game play have been randomly changed, it is necessary to provide relevant information to users so that users can plan appropriate strategies and tactics. Accordingly, the game providing device displays information representing the attributes of each object determined previously in the form of a subtitle. Since an embodiment related to the display of subtitles will be described later in FIG. 15, a description thereof will be omitted here.

According to the present embodiment, since various environmental variable values are randomly applied to objects appearing on the map 100, the unexpectedness of game play may be further enhanced, and the user experience of the user may be further diversified.

Figure 13:
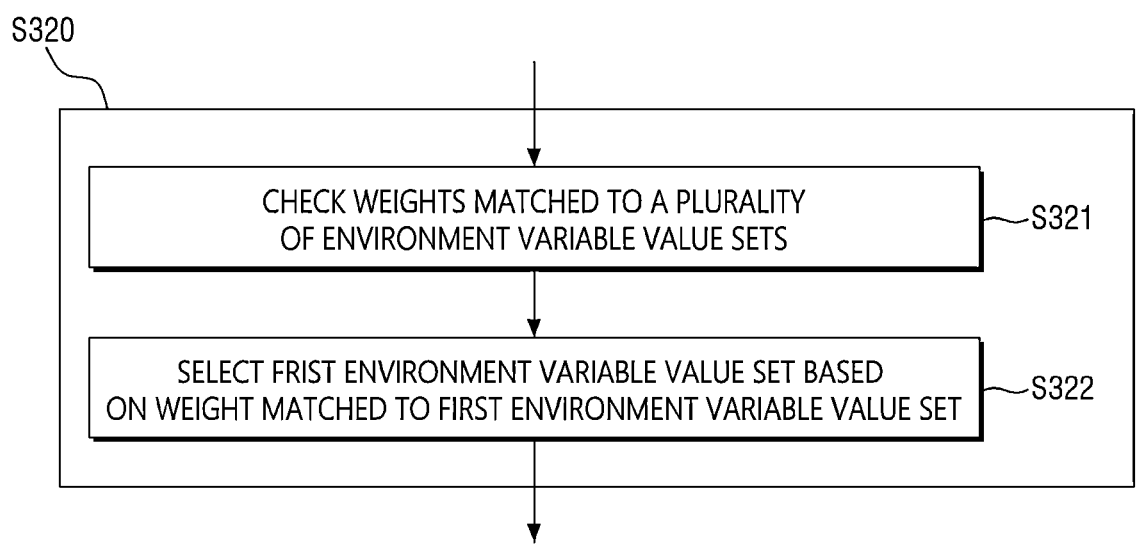
FIG. 13 is a flowchart illustrating an exemplary embodiment, in which the step S320 of randomly selecting a first environment variable value set of FIG. 11 is further embodied.

FIG. 13 is a flowchart illustrating an exemplary embodiment, in which the step S320 of randomly selecting a first environment variable value set of FIG. 11 is further embodied. In the embodiment of FIG. 13, the first environment variable value set is selected based on weights matched to each of the plurality of environment variable value sets. Hereinafter, this embodiment will be described with reference to FIGS. 13 and 14.

Figure 14:
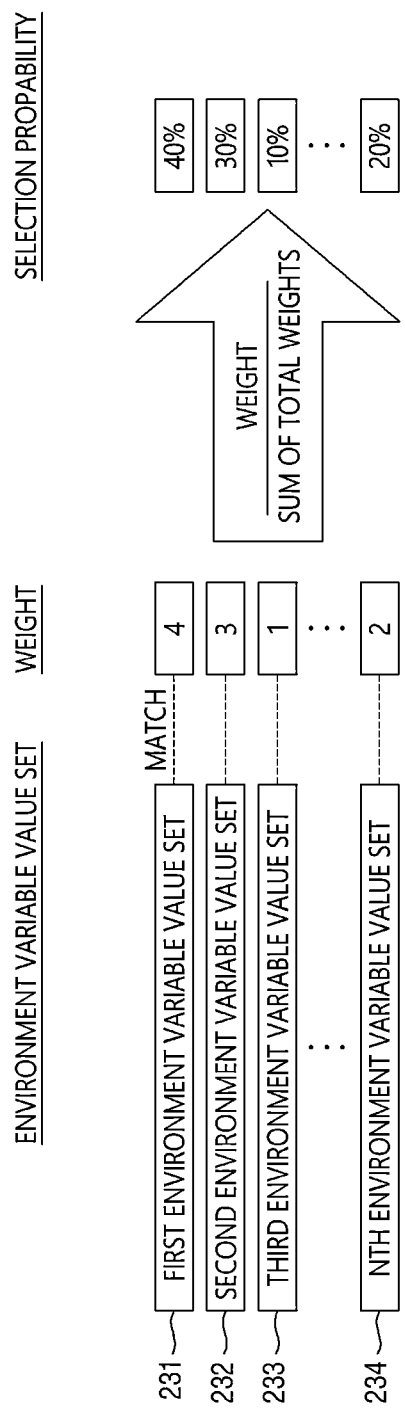
FIG. 14 is a diagram describing an exemplary method of selecting an environment variable value set to be applied to a game in consideration of a weight matched to each environment variable value set according to an embodiment of the present invention.

In step S321, the game providing device checks the weights matched for the plurality of environment variable value sets 231, 232, 233, and 234. Referring to FIG. 14, it can be seen that the weight of 4 is matched to a first environment variable value set 231, the weight of 3 is matched to a second environment variable value set 232, the weight of 1 is matched to the third environment variable value set 233, and the weight of 2 is matched to the fourth environment variable value set 234, respectively.

In step S322, the game providing device selects an environment variable value set to be applied to the map based on the weights matched to each of the environment variable value sets 231, 232, 233, and 234. In this case, the game providing device may increase the probability of selecting a corresponding environment variable value set as the matched weight increases. For example, the game providing device calculates the selection probability of each of environment variable value sets 231, 232, 233, 234 through Equation 1 below, and the environment variable value set to be applied to the map can be selected based on the calculated selection probability.

$$\text{selection probability} = \text{weight/sum of total weights} \quad \text{[Equation 1]}$$

Here, the selection probability is a probability that the corresponding environmental variable value set will be selected, the weight is a weight matched to the corresponding environmental variable value set, and the sum of total weights is a sum of all weights matched to all environment variable value sets.

In FIG. 14, assuming that the total environment variable value sets are four (231, 232, 233, 234), the selection probability of each environment variable value set is calculated as 40%, 30%, 10%, and 20% according to Equation 1 above. In addition, the game providing device may select any one of them (e.g., a first environment variable value set) as an environment variable value set to be applied to the map based on the calculated probability.

As an embodiment, a weight matched to each of the environment variable value sets 231, 232, 233, and 234 may be determined based on a user preference for the corresponding environment variable value set. For example, the weight matched to the first environment variable value set 231 is 4, but when it is determined that positive feedback or the user preference for the map, to which the first environment variable value set 231 is applied, increases, the weight matched to the first environment variable value set 231 may be adjusted upward. Conversely, when it is determined that for the map, to which the first environment variable value set 231 is applied, negative feedback increases or user preference decreases, the weight matched to the first environment variable value set 231 may be adjusted downward.

Figure 15:
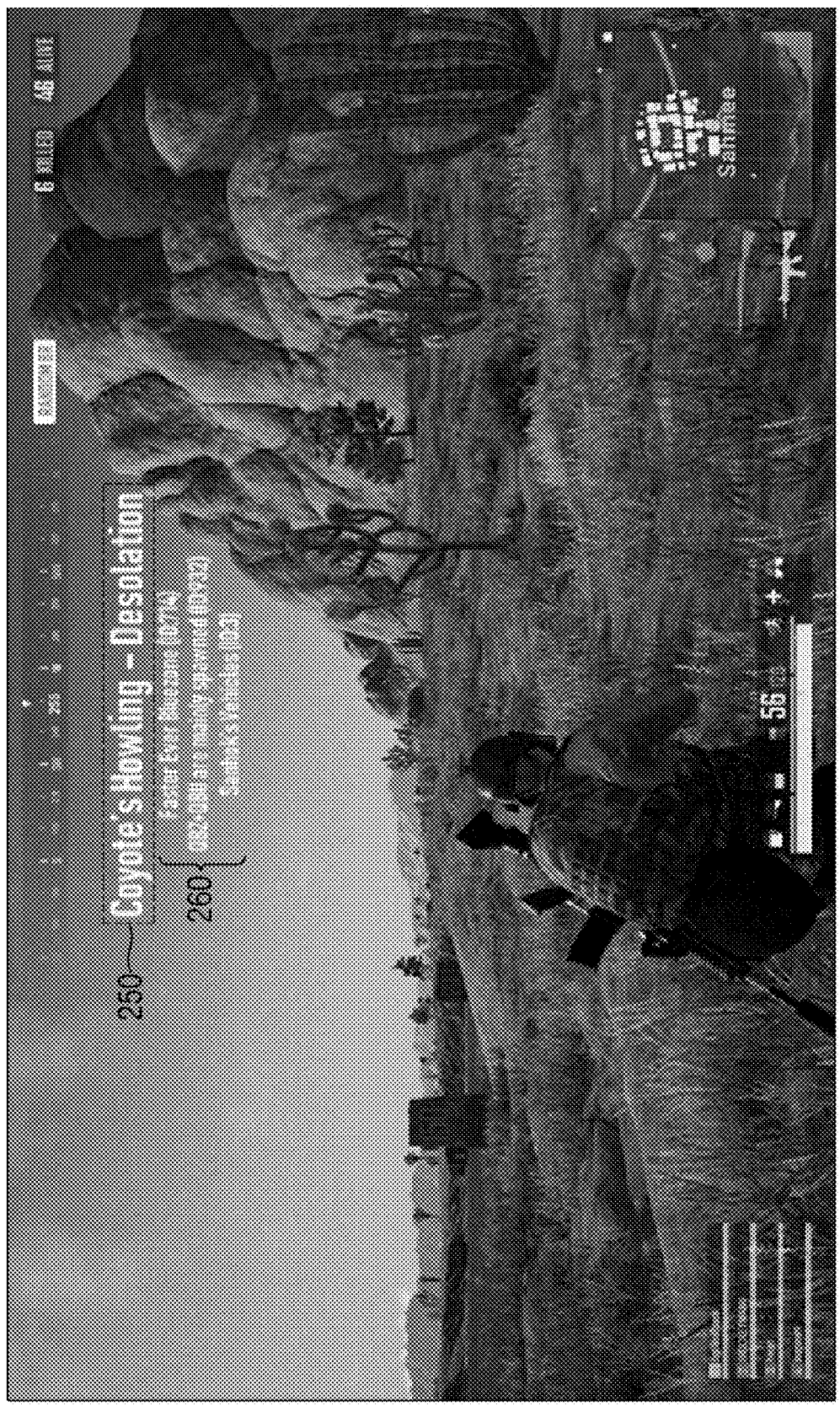
FIG. 15 is a diagram illustrating an exemplary form of an In-Game screen, in which a subtitle is displayed.

FIG. 15 is a diagram illustrating an exemplary form of the In-Game screen, in which a subtitle is displayed. In FIG. 15, a subtitle 250 of the current map is displayed in the upper center of the screen. The subtitle 250 represents the attributes of objects appearing in the current map, and may be expressed in metaphorical or implicit terms such as "Coyote's Howling—Desolation."

As an embodiment, a description 260 indicating the attribute of each object in more detail may be displayed together with the subtitle 250. For example, as shown in FIG. 15, a description indicating the attribute of the Bluezone ("Faster Ever Bluezone"), a description indicating the attribute of an item ("QBZ+QBU are mainly spawned"), or a description indicating the attribute of a vehicle ("Sanhok's Vehicles") may be displayed together with the subtitle 250. The description 260 may be displayed as text as shown in FIG. 15, but may also be displayed as a symbol abstractly representing the attribute of each object (Bluezone, item, vehicle).

As an embodiment, each individual word of the subtitle 250 may represent the attribute of a specific object. For example, it may be promised in advance that "Coyote" in the words of the subtitle 250 indicates "Faster Ever Bluezone" among the attributes of the Bluezone, and "Howling" in the words of the subtitle 250 indicates "QBZ+QBU are mainly spawned", and "Desolation" in the words of the subtitle 250 indicates "Sanhok's Vehicles" among the attributes of the vehicle.

Hereinafter, an exemplary computing device 500 that can implement an apparatus and a system, according to various embodiments of the present disclosure will be described with reference to FIG. 16.

Figure 16:
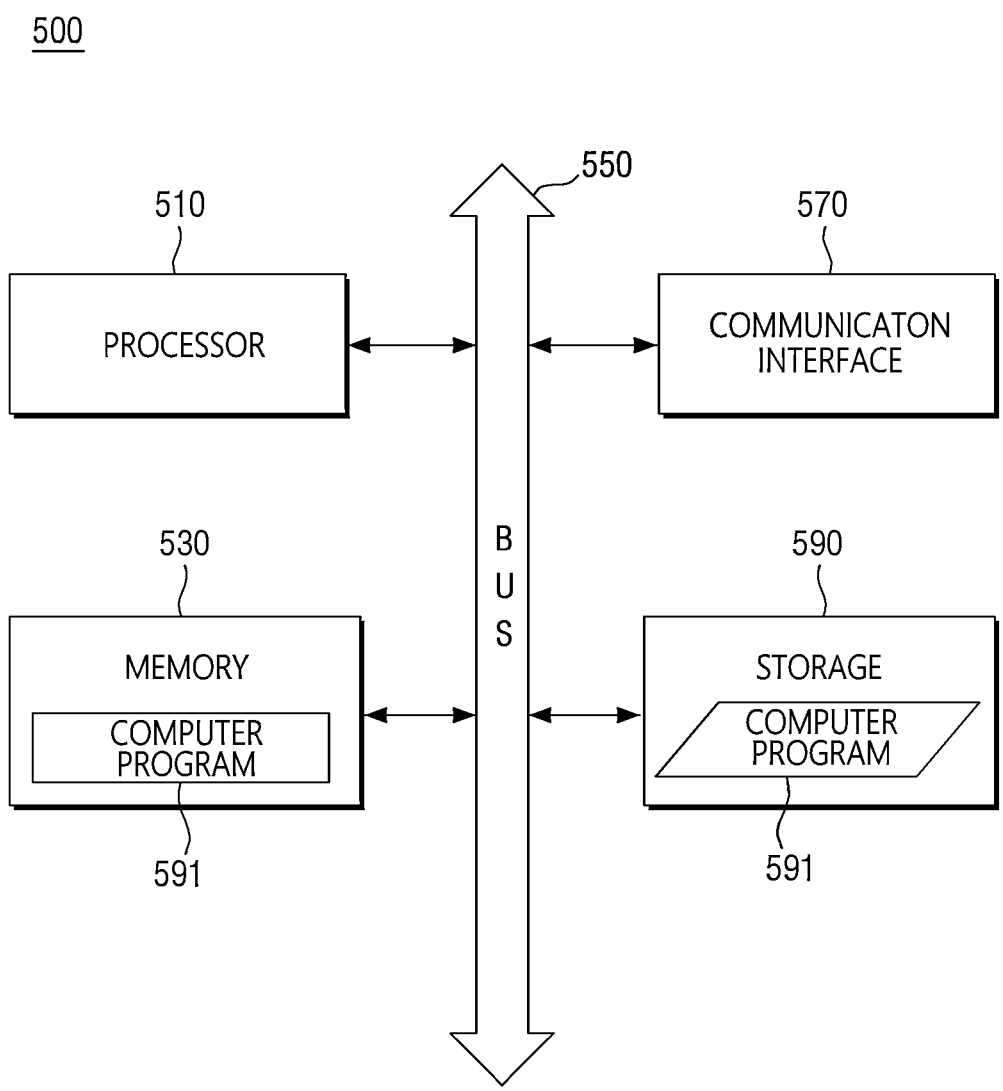
FIG. 16 is a hardware configuration diagram of an exemplary computing device, in which various embodiments of the present invention may be implemented.

FIG. 16 is an example hardware diagram illustrating a computing device 500.

As shown in FIG. 16, the computing device 500 may include one or more processors 510, a bus 550, a communication interface 570, a memory 530, which loads a computer program 591 executed by the processors 510, and a storage 590 for storing the computer program 591. However, FIG. 16 illustrates only the components related to the embodiment of the present disclosure. Therefore, it will be appreciated by those skilled in the art that the present disclosure may further include other general purpose components in addition to the components shown in FIG. 16. The computing device 500 shown in FIG. 16 may indicate any one of physical servers belong to server farm which provides Infrastructure-as-a-Service (IaaS) type of cloud services.

The processor 510 controls overall operations of each component of the computing device 500. The processor 510 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 510 may perform calculations on at least one application or program for executing a method/operation according to various embodiments of the present disclosure. The computing device 500 may have one or more processors.

The memory 530 stores various data, instructions and/or information. The memory 530 may load one or more programs 591 from the storage 590 to execute methods/operations according to various embodiments of the present disclosure. An example of the memory 530 may be a RAM, but is not limited thereto.

The bus 550 provides communication between components of the computing device 500. The bus 550 may be implemented as various types of bus such as an address bus, a data bus and a control bus.

The communication interface 570 supports wired and wireless internet communication of the computing device 500. The communication interface 570 may support various communication methods other than internet communication. To this end, the communication interface 570 may be configured to comprise a communication module well known in the art of the present disclosure.

The storage 590 can non-temporarily store one or more computer programs 591. The storage 590 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 591 may include one or more instructions, on which the methods/operations according to various embodiments of the present disclosure are implemented. When the computer program 591 is loaded on the memory 530, the processor 510 may perform the methods/operations in accordance with various embodiments of the present disclosure by executing the one or more instructions.

Various embodiments and effects of the present invention described so far by referring FIG. 1. to FIG. 16. Effects of the technical features of the present invention are not limited to the effects mentioned above, and other effects that are not mentioned will be clearly understood by those skilled in the art from the following description.

The technical features of the present disclosure described so far by referring FIG. 1. to FIG. 16 may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

According to various embodiments of the present invention described so far, the In-Game play environment is variably provided each time a game is played even with the same game map, so that the unexpectedness of the game play is further enhanced.

Further, since users are induced to use various regions of the game map, the content consumption speed of the game map can be slowed down, and thus the life of the game map can be greatly increased.

Further, by applying various random elements to the game map, it can prevent users from playing the game in a standardized way, and even maps with low user preference can enhance dynamics and diversity through random elements, thereby improving user preference as well as improving the utilization of the overall game map.

In the above, even if all the elements constituting the embodiments of the present invention have been described as being combined into one or operating in combination, the technical idea of the present invention is not necessarily limited to these embodiments. That is, as long as it is within the scope of the object of the present invention, one or more of the elements may be selectively combined and operated.

Although the operations are illustrated in a specific order in the drawings, it should not be understood that the operations should be executed in the specific order shown or in a sequential order, or all illustrated operations should be executed to obtain a desired result. In certain situations, multitasking and parallel processing may be advantageous. Moreover, the separation of the various elements in the above-described embodiments should not be understood as necessitating such separation, and it should be understood that the program components and systems described may be generally integrated together into a single software product or may be packaged into multiple software products.

Although embodiments of the present invention is described so far by referring to the drawings, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation. The scope of protection of the present invention should be interpreted by the following claims, and all technical ideas within the scope equivalent thereto should be construed as being included in the scope of the technical idea defined by the present disclosure.

What is claimed is:

1. A method for providing a game performed by a computing device comprising:

determining a map for game play;

variably determining a first area in the map;

providing a second play environment different from a first play environment of the first area on the outside of the first area, wherein an item or vehicle is not spawned or a spawn rate of the item or vehicle is lower than the first play environment in the second play environment, and the position of the first area determined at the n th(here, n is a natural number) play time and the position of the first area determined at the n+1 th play time are different;

determining a plurality of environment variable value sets;

randomly selecting a first environment variable value set to be applied to the map from the plurality of environment variable value sets; and determining an attribute of an object appearing on the map based on the first environment variable value set.

2. The method of claim 1, wherein the second play environment inflicts damage to a user playing outside the first area over time.

3. The method of claim 1, wherein a location or size of the first area is determined based on a characteristic or area of a terrain included in the first area.

4. The method of claim 1 further comprises,
determining a location or a moving path of a guide guiding a starting position of the game play based on the first area.

5. The method of claim 1 further comprises,
determining a second area including at least a portion of the first area; and
providing a third play environment different from the first play environment to outside of the second area.

6. The method of claim 5, wherein the third play environment inflicts damage to a user playing outside the second area over time.

7. The method of claim 5, wherein the first area does not change within In-Game after determination of the first area,
wherein the second area changes over time within In-Game after determination of the second area.

8. The method of claim 1, wherein the game is a game of Battle Royale genre.

9. The method of claim 1, wherein the object applies a penalty to some area of the map within In-Game and moves its boundary over time,
wherein the attribute comprises a size of the object, a degree of the penalty, delay time of the object, waiting time of the object, or moving time of the object.

10. The method of claim 1, wherein the object is the item or vehicle usable in In-Game,
wherein the attribute comprises a class, type, state, spawn location, or spawn rate of the object.

11. The method of claim 1, wherein randomly selecting the first environment variable value set comprises, selecting the first environment variable value set based on a weight matched to the first environment variable value set.

12. The method of claim 1 further comprises,
displaying a subtitle related to the determined attribute.

13. A method for providing a game performed by a computing device comprising:
determining a map for game play;
variably determining a first area in the map;
providing a second play environment different from a first play environment of the first area on the outside of the first area;
determining a second area including at least a portion of the first area and providing a third play environment different from the first play environment to outside of the second area,
wherein the position of the first area determined at the n th(here, n is a natural number) play time and the position of the first area determined at the n+1 th play time are different;
determining a plurality of environment variable value sets;
randomly selecting a first environment variable value set to be applied to the map from the plurality of environment variable value sets; and
determining an attribute of an object appearing on the map based on the first environment variable value set.

14. An apparatus for providing a game comprising:
a processor;
a memory for loading a computer program executed by the processor; and
a storage for storing the computer program,
wherein the computer program comprises instructions for performing operations comprising:
determining a map for game play;
variably determining a first area in the map;
providing a second play environment different from a first play environment of the first area on the outside of the first area,
wherein an item or vehicle is not spawned or a spawn rate of the item or vehicle is lower than the first play environment in the second play environment, and
the position of the first area determined at the n th(here, n is a natural number) play time and the position of the first area determined at the n+1 th play time are different;
determining a plurality of environment variable value sets;
randomly selecting a first environment variable value set to be applied to the map from the plurality of environment variable value sets; and
determining an attribute of an object appearing on the map based on the first environment variable value set.

* * * * *